(12) United States Patent  (10) Patent No.: US 8,249,153 B2
Lestage et al.  (45) Date of Patent: Aug. 21, 2012

(54) DISTRIBUTED SYNCHRONIZED VIDEO VIEWING AND EDITING

(75) Inventors: Stephane Lestage, Verdun (CA); Philippe Fortier, Outremont (CA)

(73) Assignee: In Extenso Holdings Inc., Montreal, Quebec (CA)

( * ) Notice: Subject to any disclaimer, the term of this patent is extended or adjusted under 35 U.S.C. 154(b) by 205 days.

(21) Appl. No.: 12/282,743

(22) PCT Filed: Jun. 11, 2008

(86) PCT No.: PCT/CA2008/001094
§ 371 (c)(1),
(2), (4) Date: Sep. 12, 2008

(87) PCT Pub. No.: WO2008/151416
PCT Pub. Date: Dec. 18, 2008

(65) Prior Publication Data
US 2010/0235857 A1  Sep. 16, 2010

Related U.S. Application Data

(60) Provisional application No. 60/943,427, filed on Jun. 12, 2007.

(51) Int. Cl.
*H04N 7/12* (2006.01)
(52) U.S. Cl. .................................. 375/240.08
(58) Field of Classification Search ............ 375/240.01, 375/240.08
See application file for complete search history.

(56) References Cited

U.S. PATENT DOCUMENTS

| 5,206,929 A | 4/1993 | Langford et al. |
| 5,600,368 A | 2/1997 | Matthews, III |
| 5,633,683 A | 5/1997 | Rosengren et al. |
| 5,649,032 A | 7/1997 | Burt et al. |

(Continued)

FOREIGN PATENT DOCUMENTS

WO  0020976  4/2000

(Continued)

OTHER PUBLICATIONS

European Search Report Application No. 08757226.9.

(Continued)

*Primary Examiner* — Gilberto Barron, Jr.
*Assistant Examiner* — Malcolm Cribbs
(74) *Attorney, Agent, or Firm* — Anglehart et al.

(57) ABSTRACT

A single composite stream of data is streamed to a user's terminal and displayed in two separate viewers. This composite stream embeds a series of substreams that are views of the same event, taken from different point of views. A first viewer, the global viewer, displays the entire composite stream of data, thus displays the n substreams the composite stream may contain. The second viewer, the focus viewer, displays only part of the composite stream in order to display the substream currently selected by the user. While the stream is played back, the user may interact with an external application's user interface to select which of the n embedded streams he wants to be displayed in the focus viewer, thus creating a cut. The series of cuts created by the user is stored internally for playback management. The user may export the series of cuts he created in an editing file (EDL formatted, for instance, without being restricted to) that can be loaded into a professional editing application. This professional editing application will then be used to create the final version of the clip.

17 Claims, 5 Drawing Sheets

U.S. PATENT DOCUMENTS

| | | |
|---|---|---|
| 6,353,461 B1 | 3/2002 | Shore et al. |
| 6,618,058 B1 | 9/2003 | Yasui |
| 6,674,960 B2 | 1/2004 | Duran et al. |
| 6,721,952 B1 | 4/2004 | Guedalia et al. |
| 6,924,846 B2 | 8/2005 | Ohba et al. |
| 7,080,392 B1 | 7/2006 | Geshwind |
| 2002/0049979 A1* | 4/2002 | White et al. ............... 725/87 |
| 2002/0097980 A1 | 7/2002 | Rudolph |
| 2002/0138842 A1 | 9/2002 | Chong et al. |
| 2004/0061780 A1 | 4/2004 | Huffman |
| 2004/0179816 A1 | 9/2004 | Takehana |
| 2004/0218099 A1 | 11/2004 | Washington |
| 2005/0091311 A1 | 4/2005 | Lund et al. |
| 2005/0165840 A1 | 7/2005 | Pratt et al. |
| 2006/0170760 A1 | 8/2006 | Anderson, Jr. et al. |
| 2006/0251383 A1 | 11/2006 | Vronay et al. |
| 2006/0274828 A1 | 12/2006 | Siemens et al. |
| 2006/0285821 A1 | 12/2006 | Kim et al. |
| 2008/0036917 A1* | 2/2008 | Pascarella et al. ............ 348/702 |

FOREIGN PATENT DOCUMENTS

| | | |
|---|---|---|
| WO | 02087218 | 10/2002 |

OTHER PUBLICATIONS

Written Opinion and International Search Report PCT/CA2008/001094.

* cited by examiner

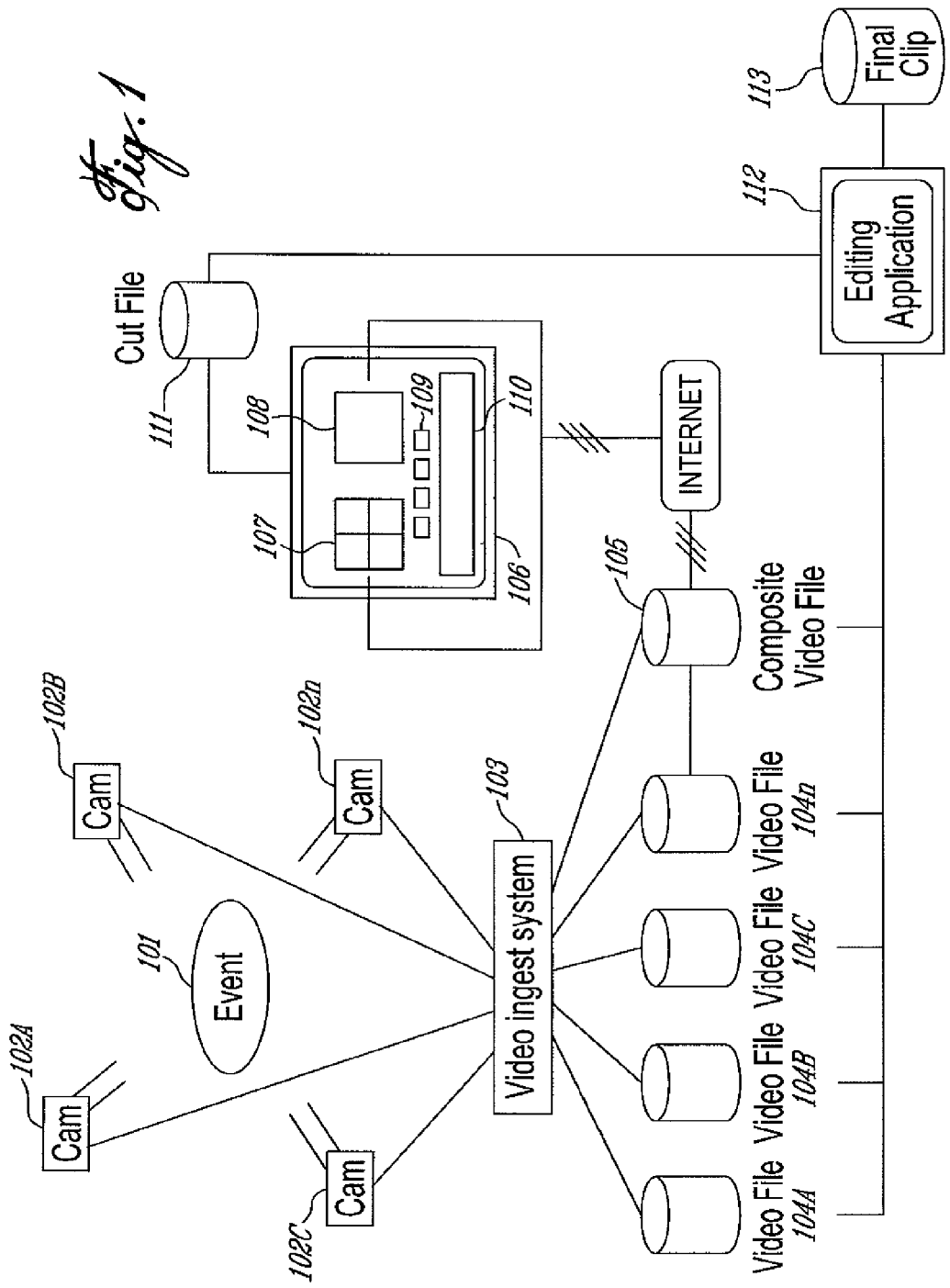

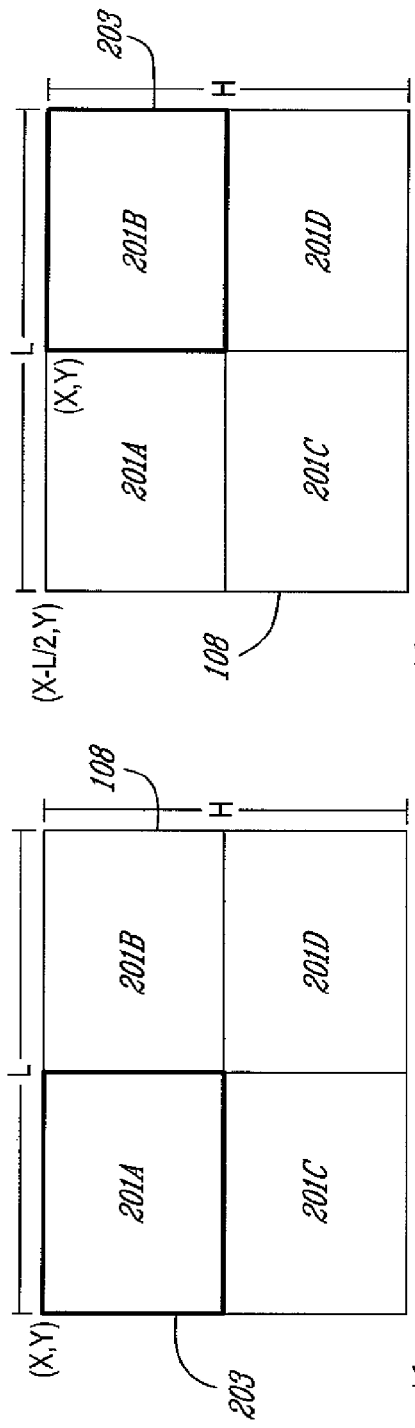
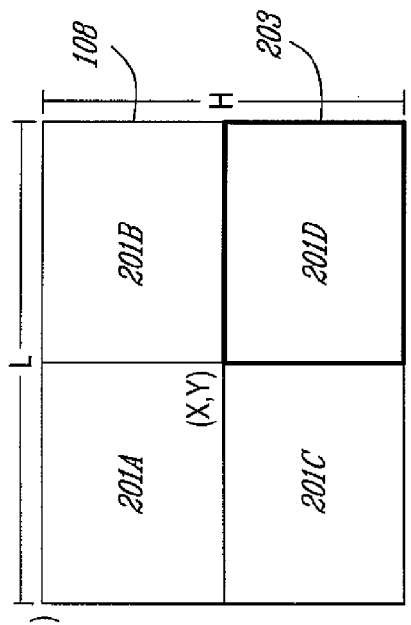
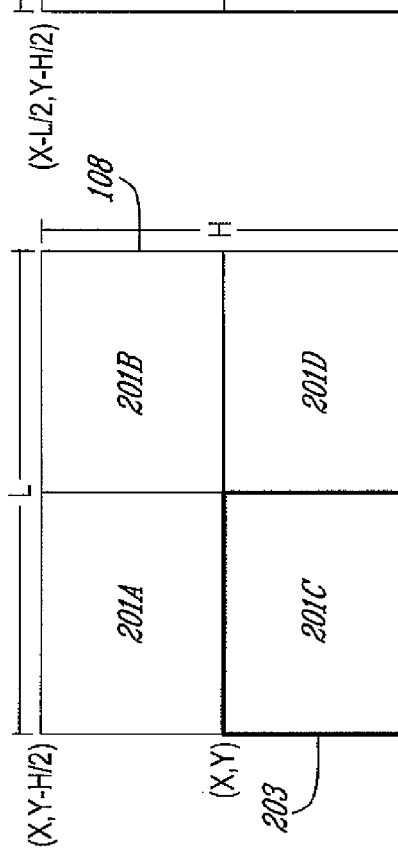

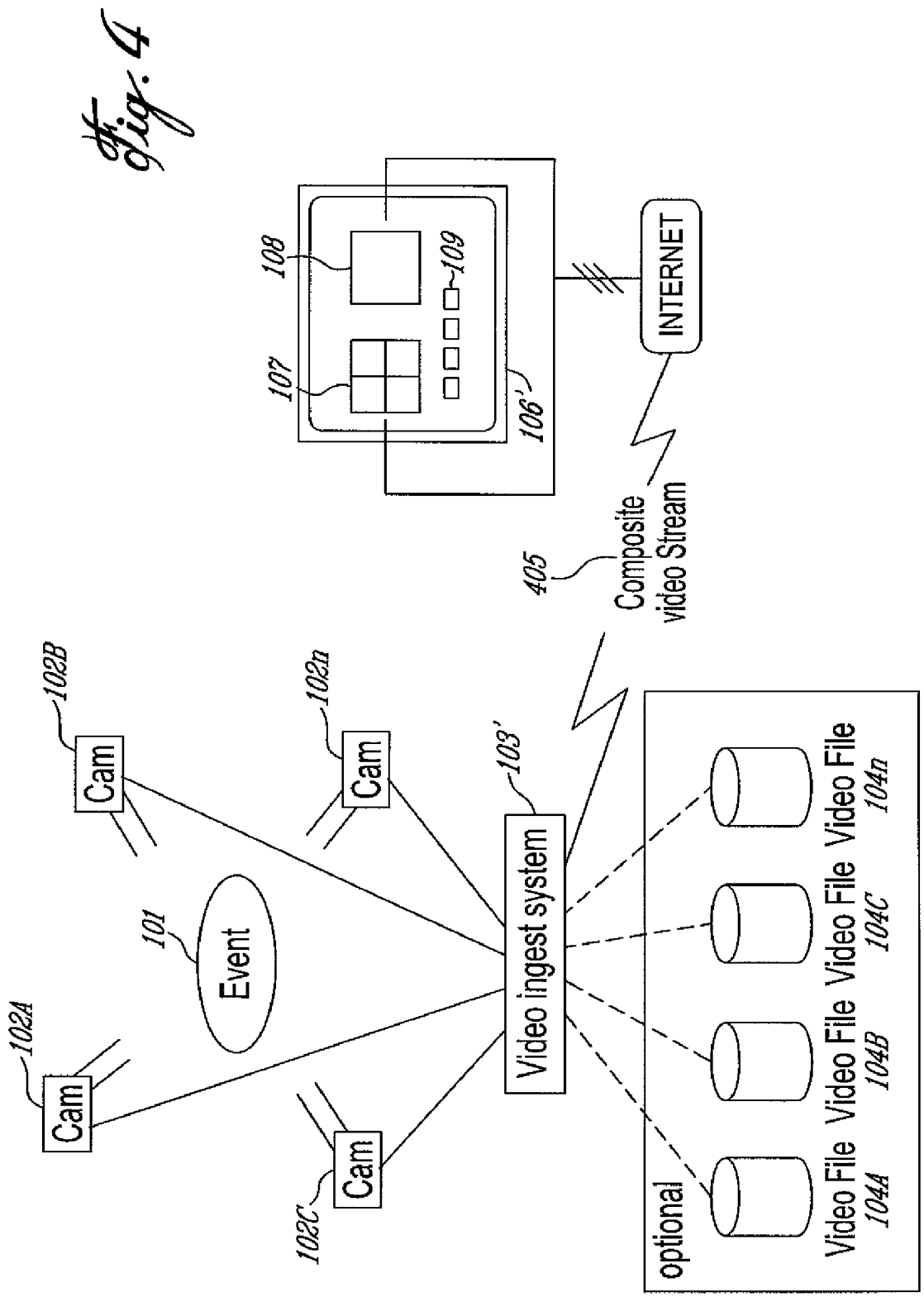

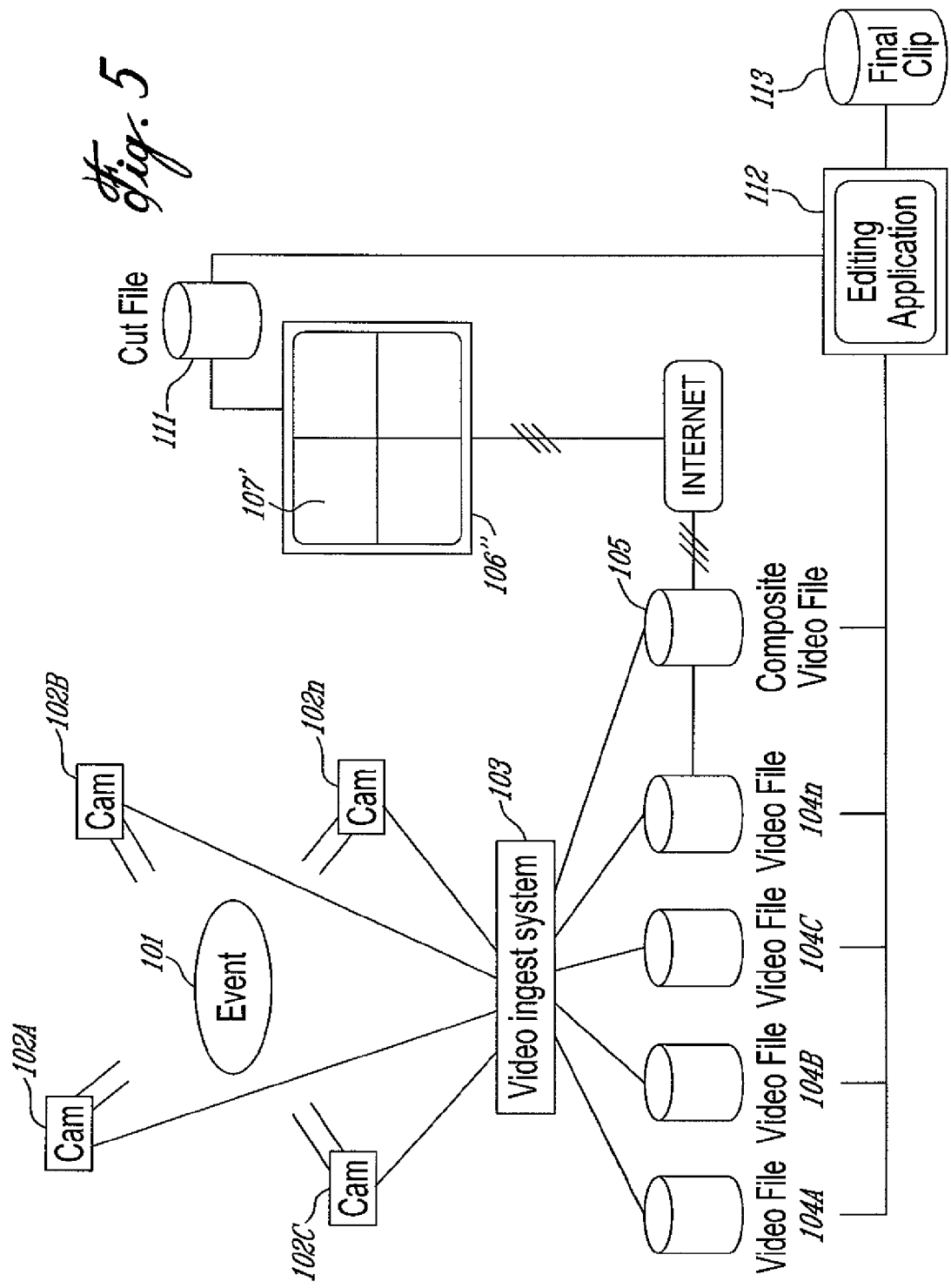

DISTRIBUTED SYNCHRONIZED VIDEO VIEWING AND EDITING

FIELD OF THE INVENTION

The present invention relates to synchronous streaming of multiple video sources over a network for viewing and/or remote video editing. The invention also relates to systems for live video editing of streaming content.

BACKGROUND OF THE INVENTION

In many situations, a scene or object is captured by multiple cameras, each of which captures a scene or object from a different angle or perspective. For example, at a live concert or at an athletic event, multiple cameras, scattered throughout the stadium, each at a different location, capture the action on the stage or playing field from different points of view.

A common practice in situations where a single clip has to be generated from multiple points of views of the same event is to hire an editor or technician in a control room to select the best view at each instant, in real or differed time. The equipment used by the editor or technician is costly and is used in this context solely to create a file that represents the cuts he/she defines. That file will then be used to feed an editing application that will generate the final clip from those cuts definitions.

Streaming video over the Internet requires a substantial amount of bandwidth. Transmitting multiple streams of images (e.g. images from multiple separate cameras) requires an exceptionally large amount of bandwidth. This large amount of bandwidth needed, added to the fact that every stream is broadcasted independently, will create synchronisation problems when several streams have to be coordinated all together.

It is know from US patent publication 2002/0049979 (White et al.) to collect multiple streams of video and generate low resolution thumbnail images to tell a user what image streams are available. A focus stream can then be selected and streamed to the user station for display.

SUMMARY OF THE INVENTION

This invention defines a methodology for editing videos from a remote computer using the Internet, by providing the user with an interface that allows him to define a series of cuts using a composite stream that embeds the images captured by the cameras all at once.

A single composite stream of data is streamed to a user's terminal and displayed in two separate viewers. This composite stream embeds a series of substreams which are views of the same event, taken from different point of views. A first viewer, the global viewer, displays the entire composite stream of data, thus displays the n substreams the composite stream may contain. The second viewer, the focus viewer, displays only part of the composite stream in order to display the substream currently selected by the user. While the stream is played back, the user may interact with an external application's user interface to select which of the n embedded streams he wants to be displayed in the focus viewer, thus creating a cut. The series of cuts created by the user is stored internally for playback management. The user may export the series of cuts he created in an editing file (EDL formatted, for instance, without being restricted to any particular format) that can be loaded into a professional editing application. This professional editing application will then be used to create the final version of the clip.

The present invention defines a system for streaming multiple views of an event in a single video stream and allow a distant user to generate an edit file that contains a series of cut definitions, which will be used to generate a final clip. Multiple streams of data, provided by cameras, are captured by an ingest computer in a control room. The ingest process will save these streams of data independently and create in parallel a single composite stream embedding the n (n=number of cameras) raw streams it receives. This embedded stream is then sent to the user's terminal, right away or in differed time. This embedded stream is then presented on a local application. This local application may be a desktop application running on the user's local computer or a web application running inside a web browser, without being restricted to these implementations. This local application presents the acquired stream in two distinct viewers. The first viewer, namely the Global Viewer, displays the whole composite image, which embeds the n source streams, while the second one, namely the Focus Viewer, displays only the portion of the composite stream that represents the current selected view. That way, as there is only one stream of data broadcasted, the needed bandwidth is minimal. This methodology also solves the problems of synchronisation that may occur when several streams are broadcasted independently.

A user can select the focus stream by clicking on the associated control button (that may be, without being restricted to, the part of the composite stream that displays the needed stream, a button presented on the interface or a keyboard shortcut). Every time a user defines a new cut, this new cut is recorded by the application. That allows the user to replay his version of the edited clip in differed time for viewing purposes. Once all the cuts have been defined accurately, the user can save his work in the system, into a cut file. This cut file will then be used to generate an EDL file (or any type of file that may be used by any automated video editing systems). This last file will then be used by an external editing system to create the final clip, using the saved streams that were created originally with the input of the cameras.

BRIEF DESCRIPTION OF DRAWINGS

The invention will be better understood by way of the following detailed description of embodiments of the invention with reference to the drawings, in which:

FIG. 1 is a schematic network diagram of an embodiment having a multi-viewpoint event recording system and remote editing station including a zoom focus window;

FIGS. 2A through 2D show a window containing a four quadrant composite image representing the streams from four cameras of the event, in which a respective focus quadrant is highlighted;

FIG. 4 is a schematic network diagram of an embodiment in which the remote station provides a focus window and does not perform editing; and FIG. 5 is a schematic network diagram of an embodiment in which the remote station provides editing tools but no focus window.

DETAILED DESCRIPTION

Figure 3:
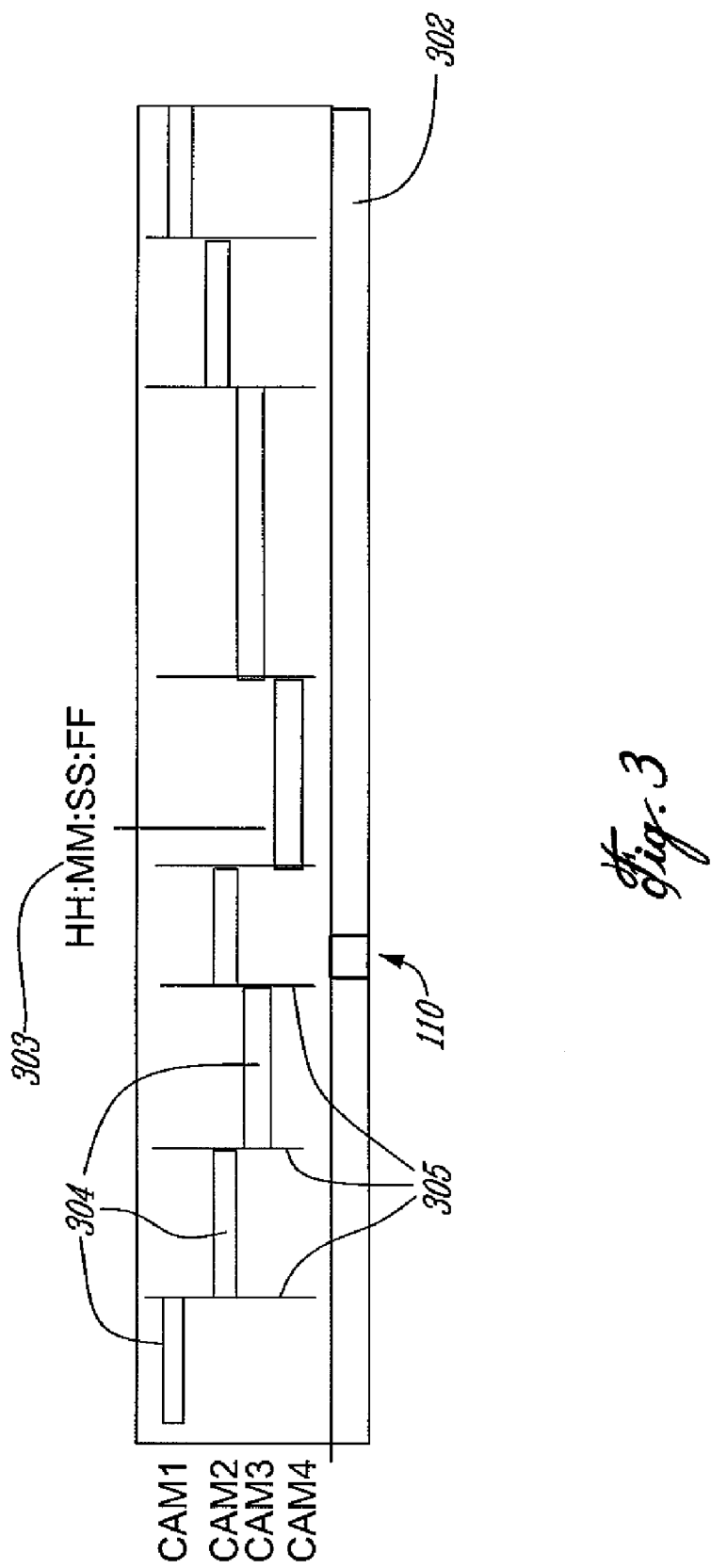
FIG. 3 illustrates a proposed embodiment of the Timeline Window.

An overall diagram of a first embodiment of the invention is shown in FIG. 1. In the first embodiment, a live event 101, which can be, without being limited to, a live show or a sporting event, is viewed and recorded by a series of n cameras (where n=4 in the diagram) 102A to 102*n*. The images sent by the cameras 102A to 102n are captured by the video ingest system 103, usually located in a control room, without being restricted to it. The ingest system 103 stores the data provided by each camera in independent video files 104A to 104n. Those files will be typically of type .wmv, .mp2, .mp4, .mpg or .mov, without being limited to these very formats. In parallel or afterward, using the data saved in files 104A to 104n, the video ingest system 103 will create a composite video file and store this file in a Composite Video File Server 105, which embeds a composite view of Video Files 104A to 104n. This file will also be of type .wmv, .flv, .mp2, .mp3, .mpg or .mov, without being limited to these very formats neither. Server 105 is adapted to stream over the wide area network or Internet the composite video data for real-time remote viewing.

A remote application 106, which can be a desktop application on a remote computer or a web application running inside a Web Browser, will receive the stream of the Composite Video File 105 and display it in two independent viewers 107 and 108, which will share the same streaming data from Composite Video File 105. Viewer 107, namely the Global Viewer, displays the entire composite stream. Viewer 108, namely the Focus Viewer, will only display the part of the stream that represents the substream currently selected (that is, the stream provided initially from a single camera). The user will be selecting the current substream by using the control buttons 109. A timeline 110 displays a timewise view of the cuts (defined as a time when the focus substream has been changed). The timeline 110 will allow the user to define and edit the cuts he created and modify them as needed. Once the editing process is completed, the user may save its editing data into a cut file 111. This cut file 111 will be of any format needed to feed any external Editing Application 112, like, without being limited to, an AVID system. A typical cut file 111 will be transformed as, without being limited to, an .EDL formatted file.

The Editing Application 112 will read the cut file 111 and load the original Video Files 104A to 104N to produce the Final Clip 113. The loading of the original Video Files 104 can be done by physical transport of a data recording medium, by transmission over the Internet, or by transmission over a different data link. This final clip will be of type .wmv, .flv, .mpg, .mp3, .mpg or .mov, without being limited to these very formats.

FIGS. 2A to 2D illustrate an embodiment for the Focus Viewer 108. As was mentioned earlier, the main feature of this system is the fact that a single stream is used, ensuring streaming synchronisation and minimal bandwidth usage. Internally, the Editing Viewer 108 actually displays the entire data streamed from the Composite Video File 105. In this embodiment, the Focus Viewer 108 is actually displaying the stream behind a mask. The Focus Viewer's 108 location will be modified to place the relevant portion of the stream in front of the mask's window 203. Thus, the viewer window is sized to see only one quadrant of the whole composite video image, and the viewing window is framed to show only the unmasked, selected quadrant.

FIGS. 2A to 2D illustrate an example of how this is done using a quad view generated from the data obtained from four cameras. Note that the same technique may apply with any number of cameras. In this proposed embodiment, the stream received is a quad made of four views, each of which displays the output of a single camera selected from sources 102A to 102n, arranged in a set of two rows and two columns. The Focus Viewer 108 displays the whole composite view behind the interface. The interface presents a see-through window 203 at position (x,y). The width and height of this see-through window 203 is set to fit the width and height of a substream embedded in the Composite Video Stream 105. Usually, without being restricted to this configuration, the Focus Viewer 108 will be zoomed as for the see-through window to be of the same width and height as the Global Viewer 107. For example, if the composite view is made of four substreams, displayed as a table of two rows and two columns, the Focus Viewer 108 will be twice the width and twice the height of the Global Viewer 107. In a more general fashion, if the Global Viewer 107 presents the substreams arranged in n columns and m rows, the Focus Viewer will be n times wider and m times higher than the Global Viewer 107. Every time the user changes the stream focus, the Focus Viewer 108 is moved to align the right view with the see-through window 203.

FIG. 2 shows the placement of the Focus Viewer 108 according to the focus stream, when the Global Viewer 107 displays a composite stream made of four substreams, arranged as a table of two rows and two columns.

As shown in FIG. 2A, placing the sub window at pos (X,Y) will show the stream 201A to the user.

As shown in FIG. 2B, placing the sub window at pos (X−L/2,Y) will show the stream 201B to the user.

As shown in FIG. 2C, placing the sub window at pos (X,Y−H/2) will show the stream 201C to the user.

As shown in FIG. 2D, placing the sub window at pos (X−L/2,Y−H/2) will show the stream 201D to the user.

Where:
X=horizontal location of the see-through window 203
Y=vertical location of the see-through window 203
W=width of the entire Focus Viewer 108. That is, the width of a substream is W/2
H=height of the entire Focus Viewer 108. That is, the height of a substream is H/2

FIG. 3 illustrates a preferred embodiment, without being limited to, of the Timeline Editor 110.

The Timeline Window 110 displays the cuts defined by the user. A cut is defined as a change in the Focus View that occurred. A cut is defined by, without being limited to such, a timestamp and a View Id. In this embodiment, the cuts are displayed in the Timeline Window 110 as a series of horizontal bars 304. Each of those horizontal bars 304 are located vertically as to represent which view is used for the cut. The width of those horizontal bars 304 represents the duration of the cut. That is, the width of the Timeline Window 110 represents a certain number of seconds. The applications interface allows the user to move those horizontal bars 304 vertically, thus allowing the user to change the view used for the specific cut. Between each cut, a horizontal cut time bar 305 is displayed as well. These cut time bars 305 may be moved horizontally to change the time at which the cut actually occurs. The user may select the current playback time by moving the scrollbar 302 located under the Timeline Window 110. The actual playback time is displayed in the Time Field 303. The format of the playback time displayed in the playback time field 303 is of the form HH:MM:SS:FF, where HH represents the number of hours from the beginning of the file, MM represents the number of minutes from the beginning of the file, SS represents the number of seconds from the beginning of the file and FF the number of frames from the beginning of the file. Typically, without being limited to this, there are 29.96 frames per seconds in a stream.

An overall diagram of a second embodiment of the invention is shown in FIG. 4. In this second embodiment of the invention, a live event 101, which can be, without being limited thereto, as in the first embodiment, a live show or a sporting event, is viewed and recorded by a series of n cameras (where n=4 in the diagram) 102A to 102n. The images sent by the cameras 102A to 102n are captured by the video ingest system 103', usually located in a control room, without being restricted to it. In this embodiment, the ingest system 103' may store the data provided by each camera in independent video files 104A to 104n. Those files will be typically of type .wmv, .flv, .mp2, .mp4, .mpg or .mov, without being limited to these very formats. Using the data saved in files 104A to 104n, or directly from the video capture data, the video ingest system 103' creates a Composite Video Stream 405, which embeds a composite view of Video Files 104A to 104n. In this embodiment, the server 105 is incorporated into the video ingest system 103', and the composite video stream 405 is directly generated. This file will also be of type .wmv, .mp2, .mp3, .mpg or .mov, without being limited to these very formats neither.

A remote application 106', which can be a desktop application on a remote computer or a web application running inside a Web Browser, will receive the stream of the Composite Video Stream 405 and display it in two independent viewers 107 and 108, which will share the same streaming data from Composite Video Stream 405. Viewer 107, namely the Global Viewer, displays the entire composite stream. Viewer 108, namely the Focus Viewer, will only display the part of the stream that represents the substream currently selected (that is, the stream provided initially from a single camera). The user will be selecting the focus substream by using the control buttons 109.

The functionality of the Focus Viewer 108 is, in this second embodiment, the same as the one of the Focus Viewer 108 presented in the first embodiment.

An overall diagram of a third embodiment of the invention is shown in FIG. 5. In the third embodiment of the invention, a live event 101, which can be, as in the first and second embodiment, without being limited to, a live show or a sporting event, is viewed and recorded by a series of n cameras (where n=4 in the diagram) 102A to 102n. The images sent by the cameras 102A to 102n are captured by the video ingest system 103, usually located in a control room, without being restricted to it. The ingest system 103 stores the data provided by each camera in independent video files 104A to 104n. Those files will be typically of type .wmv, .flv, .mp2, .mp4, .mpg or .mov, without being limited to these very formats. In parallel or afterward, using the data saved in files 104A to 104n, the video ingest system 103 will create a Composite Video File to be stored in server 105, which embeds a composite view of Video Files 104A to 104n. This file will also be of type .wmv, .flv, .mp2, .mp3, .mpg or .mov, without being limited to these very formats neither.

A remote application 106", which can be a desktop application on a remote computer or a web application running inside a Web Browser, will receive the stream of the Composite Video File 105 and display it in a Global Viewer 507. The Global Viewer 107' displays the entire composite stream in full screen mode. The user selects the current substream by clicking a button of the computer mouse when the pointer is over the part of the Global Viewer 107' that represents the substream he wants to select, thus defining a cut. This selection may also be made by the user by using his finger on a touch screen on which the Global Viewer 107' is displayed. Once the stream is completed, the collection of cuts defined by the user will be saved into a cut file 111. This cut file 508 will be of any format needed to feed any external Editing Application 112, like, without being limited to, an AVID system. A typical cut file 111 will be transformed as, without being limited to, an .EDL formatted file.

The Editing Application 112 will read the cut file 111 and load the original Video Files 104A to 104N to produce the Final Clip 113. This final clip will be of type .wmv, .flv, .mp2, .mp3, .mpg or .mov, without being limited to these very formats.

In the embodiments described above, the composite display window 107 is a single window having said video sources arranged in an n by m matrix, namely a 2 by 2 matrix in the drawings for the case of four video sources. It will be appreciated that the composite display window can be adapted to display a portion of the composite video corresponding to a portion of the video sources. For example, a strip corresponding to a row or column of the composite can be displayed. Also, the composite display window can be two or more windows each presenting a portion of the composite video corresponding to a portion of the video sources. These windows could be arranged to be contiguous or not as desired. It can be desirable to arrange these windows in a row or column and present all of the video sources contained in the composite video in the row or column.

When bandwidth permits, a dimension or resolution of the composite video can be larger than a standard resolution for a computer screen, for example 1024×768, 1440×900 or the like, and the composite video can be resized or cropped and rearranged to fit on at least one display surface. The dimension or resolution of the composite video can be selected as a function of an available bandwidth of a transmission channel over the wide area network, the composite video can be scaled appropriately prior to display in the composite display window. The dimension or resolution can be doubled when available bandwidth is above a given threshold.

In the above embodiments, the composite video stream is created by scaling images from independent sources (e.g. the different viewpoints) and building the sequence of concatenated (or mosaic) images that forms the source composite image stream. This source is then compressed and encoded for storage and/or transmission over the network as a stream to the viewing or editing station 106. This arrangement ensures without question that the individual video files 104 are viewed at station 106 synchronously. In these embodiments, the image quality of all of the video sources 104 as represented in the compressed and decompressed composite video stream is essentially the same.

However, it is known in the art to encode video data with encoding schemes that permit a region of interest to be given higher priority or otherwise be subjected to less loss. Thus in one embodiment of the invention, the user selection of the focus stream 108 is communicated back to server 105, so that the server 105 may encode the composite video stream with less loss for the region of interest corresponding to the selected video file 104. As this selection does not interrupt continuity of the stream being served, or otherwise interrupt encoding, the change of region of interest does not disturb viewing the composite stream or the selected focus stream. When the region of interest is shifted, the viewer will see the enhanced resolution for that region of interest only after the transport delay and the buffering delay (i.e. the total latency between reading of the source composite video data for encoding by server 105 and display at the station 106). This delay can be expected to be several seconds. However, the quality of the non-selected regions (e.g. the other three quadrants) is maintained sufficiently high that the user can immediate switch focus without the loss in the ability to perform editing functions that require recognition of objects and movement in the new focus stream. Nevertheless, the selected focus stream will, after the total latency delay, increase in resolution (spatial and/or temporal) so as to provide good quality video and more enjoyable viewing.

In the embodiment of FIG. 4, this would allow the focus window 108 to be on a separate full screen. When the data transmission rate over the network is degraded, it is also known in the art to prioritize the transmission of the data so as to provide the requisite base resolution for all regions, and thereafter provide higher resolution for the selected region of interest if bandwidth permits. If further bandwidth is still available, the resolution of the remaining regions can then be included in the stream, such that all regions enjoy the higher resolution. In this case, switching from one region to another will provide good resolution in the window 108 without delay.

What is claimed is:

1. A video editing system comprising:
a plurality of video sources originating from a plurality of cameras;
a composite video generator receiving said video sources and providing a file of a composite video containing all of said video sources;
a video streaming server receiving said composite video file and connected to a wide area network for streaming said composite video file for real-time display;
a remote video editor connected to said network and receiving a single stream of data over said network from said video streaming server, said single stream of data being a real-time stream of said composite video file, said editor having:
a composite display window displaying said composite video from said stream;
a source selection interface for receiving a user selection of a desired one of said video sources during said receiving of said stream;
an edit file generator receiving said user selection to generate an edit control file;
a video editor retrieving, separately in time from said receiving said stream, said plurality of video sources and said edit control file to generate and store an edited video file in accordance with said edit control file.

2. The video editing system as claimed in claim 1, further comprising:
a focus display window displaying a copy of said desired one of said video sources from said composite video.

3. The video editing system as claimed in claim 1, wherein said composite display window is a single window having said video sources arranged in an n by m matrix.

4. The video editing system as claimed in claim 1, wherein said composite display window is adapted to display a portion of said composite video corresponding to a portion of said video sources.

5. The video editing system as claimed in claim 4, wherein said composite display window comprises two or more windows each presenting a portion of said composite video corresponding to a portion of said video sources.

6. The video editing system as claimed in claim 5, wherein said two or more windows are arranged in a row or column and present all of said video sources contained in said composite video.

7. The video editing system as claimed in claim 1, wherein a dimension or resolution of said composite video is larger than a standard resolution for a computer screen, and said composite video is resized or cropped and rearranged to fit on at least one display surface.

8. The video editing system as claimed in claim 7, wherein said dimension or resolution of said composite video is selected as a function of an available bandwidth of a transmission channel over said wide area network, said composite video being scaled appropriately prior to display in said composite display window.

9. The video editing system as claimed in claim 8, wherein said dimension or resolution is doubled when available bandwidth is above a given threshold.

10. A synchronous video viewing system comprising:
a plurality of video sources originating from a plurality of cameras;
a composite video generator receiving said video sources and providing a file of a composite video containing all of said video sources;
a video streaming server receiving said composite video file and connected to a wide area network for streaming said composite video file for real-time display; and
a remote video viewer connected to said network and receiving a single stream of data over said network from said video streaming server, said single stream of data being a real-time stream of said composite video file, said viewer having:
a source selection interface for receiving a user selection of a desired one of said video sources during said receiving of said stream; and
a focus display window displaying a copy of said desired one of said video sources extracted from said composite video.

11. The video viewing system as claimed in claim 10, wherein said remote video viewer further includes a composite display window displaying said composite video from said stream, said composite display window being a single window having said video sources arranged in an n by m matrix.

12. The video viewing system as claimed in claim 10, wherein said composite display window is adapted to display a portion of said composite video corresponding to a portion of said video sources.

13. The video viewing system as claimed in claim 12, wherein said composite display window comprises two or more windows each presenting a portion of said composite video corresponding to a portion of said video sources.

14. The video viewing system as claimed in claim 13, wherein said two or more windows are arranged in a row or column and present all of said video sources contained in said composite video.

15. The video viewing system as claimed in claim 10, wherein a dimension or resolution of said composite video is larger than a standard resolution for a computer screen, and said composite video is resized or cropped and rearranged to fit on at least one display surface.

16. The video viewing system as claimed in claim 15, wherein said dimension or resolution of said composite video is selected as a function of an available bandwidth of a transmission channel over said wide area network, said composite video being scaled appropriately prior to display in said composite display window.

17. The video viewing system as claimed in claim 16, wherein said dimension or resolution is doubled when available bandwidth is above a given threshold.

* * * * *